United States Patent
Chu et al.

(10) Patent No.: US 9,413,539 B2
(45) Date of Patent: Aug. 9, 2016

(54) ANALOG FRONT-END TRANSMITTER AND A CONNECTION METHOD OF AN X-DIGITAL SUBSCRIBER LINE HAVING A PRE-DISTORTION MECHANISM

(71) Applicant: Realtek Semiconductor Corp., Hsinchu (TW)

(72) Inventors: Hung-Chen Chu, Chia Yi County (TW); Yung Tai Chen, Hsin Chu (TW); Shian-Ru Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 218 days.

(21) Appl. No.: 14/248,944

(22) Filed: Apr. 9, 2014

(65) Prior Publication Data

US 2014/0307867 A1 Oct. 16, 2014

(30) Foreign Application Priority Data

Apr. 10, 2013 (TW) .............................. 102112616 A

(51) Int. Cl.
| | |
|---|---|
| H04M 1/00 | (2006.01) |
| H04M 9/00 | (2006.01) |
| H04L 12/00 | (2006.01) |
| H04M 3/30 | (2006.01) |
| H04Q 11/00 | (2006.01) |
| H04L 12/64 | (2006.01) |

(52) U.S. Cl.
CPC ............ *H04L 12/00* (2013.01); *H04L 12/6418* (2013.01); *H04M 3/304* (2013.01); *H04Q 11/00* (2013.01); *H04Q 2213/1319* (2013.01); *H04Q 2213/13039* (2013.01)

(58) Field of Classification Search
CPC ...................................................... H04L 12/00
See application file for complete search history.

(56) References Cited

U.S. PATENT DOCUMENTS

| | | | | |
|---|---|---|---|---|
| 5,049,832 | A * | 9/1991 | Cavers ................... | H03F 1/3247 330/149 |
| 5,872,814 | A * | 2/1999 | McMeekin ........... | H03F 1/3241 370/335 |
| 6,035,000 | A * | 3/2000 | Bingham ............. | H04L 27/2602 370/525 |
| 6,055,268 | A * | 4/2000 | Timm ................... | H04L 1/0003 375/229 |
| 6,072,364 | A * | 6/2000 | Jeckeln ................. | H03F 1/3247 330/149 |

(Continued)

FOREIGN PATENT DOCUMENTS

TW 201000927 A1 1/2010

*Primary Examiner* — Joseph T Phan
(74) *Attorney, Agent, or Firm* — Muncy, Geissler, Olds & Lowe, P.C.

(57) ABSTRACT

A Pre-distortion mechanism for transmit path non-linearity in xDSL AFE is disclosed in the present invention. The AFE includes a line driver and a pre-distortion signal generator. The line driver receives an input differential signal and generates an output differential signal. The input differential signal includes a first input signal and a second input signal. The output differential signal includes a first output signal and a second output signal. The line driver receives the first input signal to generate the first output signal and receives the second input signal to generate the second output signal. The pre-distortion signal generator is coupled to input ends and output ends of the line driver. The pre-distortion signal generator generates a pre-distortion signal according to a first difference between the first input signal and the first output signal, and a second difference between the second input signal and the second output signal so as to adjust an output state of the analog front-end transmitter having a pre-distortion mechanism.

15 Claims, 10 Drawing Sheets

(56) References Cited

U.S. PATENT DOCUMENTS

| | | | |
|---|---|---|---|
| 6,345,071 B1 * | 2/2002 | Hamdi | H04L 1/001 370/252 |
| 6,654,426 B2 * | 11/2003 | Lagerblom | H04L 27/2071 375/296 |
| 6,873,653 B1 * | 3/2005 | Rezvani | H04L 27/2601 375/219 |
| 7,158,563 B2 * | 1/2007 | Ginis | H04L 7/0016 370/201 |
| 8,345,565 B2 * | 1/2013 | Hirsch | H04L 1/0002 370/229 |
| 8,515,014 B2 * | 8/2013 | Blackburn | H04M 3/306 379/1.04 |
| 2012/0134399 A1 * | 5/2012 | Gandhi | H03G 3/3042 375/224 |

* cited by examiner

ANALOG FRONT-END TRANSMITTER AND A CONNECTION METHOD OF AN X-DIGITAL SUBSCRIBER LINE HAVING A PRE-DISTORTION MECHANISM

This application claims the benefit of the filing date of Taiwan Application Ser. No. 102112616, filed on Apr. 10, 2013, the content of which is incorporated herein by reference.

BACKGROUND OF THE INVENTION

1. Technical Field

The invention relates to an analog front-end transmitter and a connection method of an x-Digital Subscriber Line having a pre-distortion mechanism.

2. Description of the Related Art

FIG. 1 shows a circuit block diagram illustrating a general x-Digital Subscriber Line (xDSL). The xDSL 100 includes a transmitter 101, a digital signal processor (DSP) 102, a transformer 103 and a receiver 104. The transmitter 101 includes a digital-to-analog converter (DAC) 101a, a transmission filter (TXF) 101b, and a line driver (LD) 101c where the TXF 101b is a transmit path filter. The receiver 104 includes a receiving unit (RX) 104a and an analog-to-digital converter (ADC) 104b. The receiving unit 104a includes an operation amplifier (OP) (not shown in the figure) and a filter circuit (not shown in the figure).

The digital signal processor 102 outputs a digital signal to the digital-to-analog converter 101a of the transmitter 101 and the digital-to-analog converter 101a converts the digital signal into an analog signal. Then, the analog signal is transmitted to a Telephone line via being processed by other circuits: the transmission filter 101b, the line driver 101c of the transmitter 101 and the transformer 103. Further the xDSL 100 receives a signal from the Telephone line via the transformer 103 and the receiving unit 104a and the analog-to-digital converter 104b of the receiver 104, and the received signal is converted into a digital signal by the analog-to-digital converter 104b and transmitted to the digital signal processor 102.

Since the Telephone line is low resistance and high load about 50~150 ohm, the output stage (line driver 101c) of the transmitter 101 of the xDSL 100 needs large power to drive the load of the Telephone line and to maintain high linearity. In general, in order to maintain or increase linearity of the line driver 101c, more power or more area is required. However, large power consumption of the line driver 101c may not conform to an increasingly stringent power saving regulation. Therefore how to maintain the line driver 101c under acceptable performance but low power consumption becomes an important design target. Especially, since there are numerous ports in end offices, reducing power consumption is a problem which needs to be solved.

BRIEF SUMMARY OF THE INVENTION

In light of the above-mentioned problems, an objective is to provide an analog front-end transmitter having a pre-distortion mechanism to detect a difference between an input and an output of a line driver so as to increase linearity of the line driver.

An objective is to provide an analog front-end transmitter having a pre-distortion mechanism to detect a signal distortion and then generate a pre-detected signal to compensate an output distortion of the analog front-end transmitter having a pre-distortion mechanism.

An embodiment of the invention provides an analog front-end transmitter having a pre-distortion mechanism. The analog front-end transmitter having a pre-distortion mechanism includes a line driver and a pre-distortion signal generator. The line driver receives an input differential signal and generates an output differential signal. The input differential signal includes a first input signal and a second input signal. The output differential signal includes a first output signal and a second output signal. The line driver receives the first input signal to generate the first output signal and receives the second input signal to generate the second output signal. The pre-distortion signal generator is coupled to input ends and output ends of the line driver. The pre-distortion signal generator generates a pre-distortion signal according to a first difference between the first input signal and the first output signal, and a second difference between the second input signal and the second output signal so as to adjust an output state of the analog front-end transmitter having a pre-distortion mechanism.

Another embodiment of the invention provides a connection method of an x-Digital Subscriber Line having a pre-distortion mechanism. The method includes the following steps: providing an x-Digital Subscriber Line to detect a length of connection; executing handshaking of the x-Digital Subscriber Line to define a plan of online signal power and bandwidths; providing an analog front-end transmitter having a pre-distortion mechanism to generate a pre-distortion table and selecting a pre-distortion value according to current online signals; and providing a digital signal processor to adjust a difference between input and output signals of a line driver of the analog front-end transmitter having a pre-distortion mechanism according to the pre-distortion value.

Another embodiment of the invention provides a method for adjusting an output of an analog front-end transmitter having a pre-distortion mechanism. The method includes the following steps: receiving an input differential signal and generating an output differential signal wherein the input differential signal includes a first input signal and a second input signal; the output differential signal includes a first output signal and a second output signal; receiving the first input signal to generate the first output signal; receiving the second input signal to generate the second output signal; and generating a pre-distortion signal according to a first difference between the first input signal and the first output signal, and a second difference between the second input signal and the second output signal so as to adjust the output of the analog front-end transmitter having a pre-distortion mechanism.

The analog front-end transmitter having a pre-distortion mechanism and the above mentioned method use differences between input and output signals of the line driver to generate pre-distortion signal so as to compensate performance of a line driver, and to achieve the purposes of increasing linearity of a line driver and reducing power consumption of circuits of an xDSL.

DETAILED DESCRIPTION OF THE INVENTION

Figure 1:
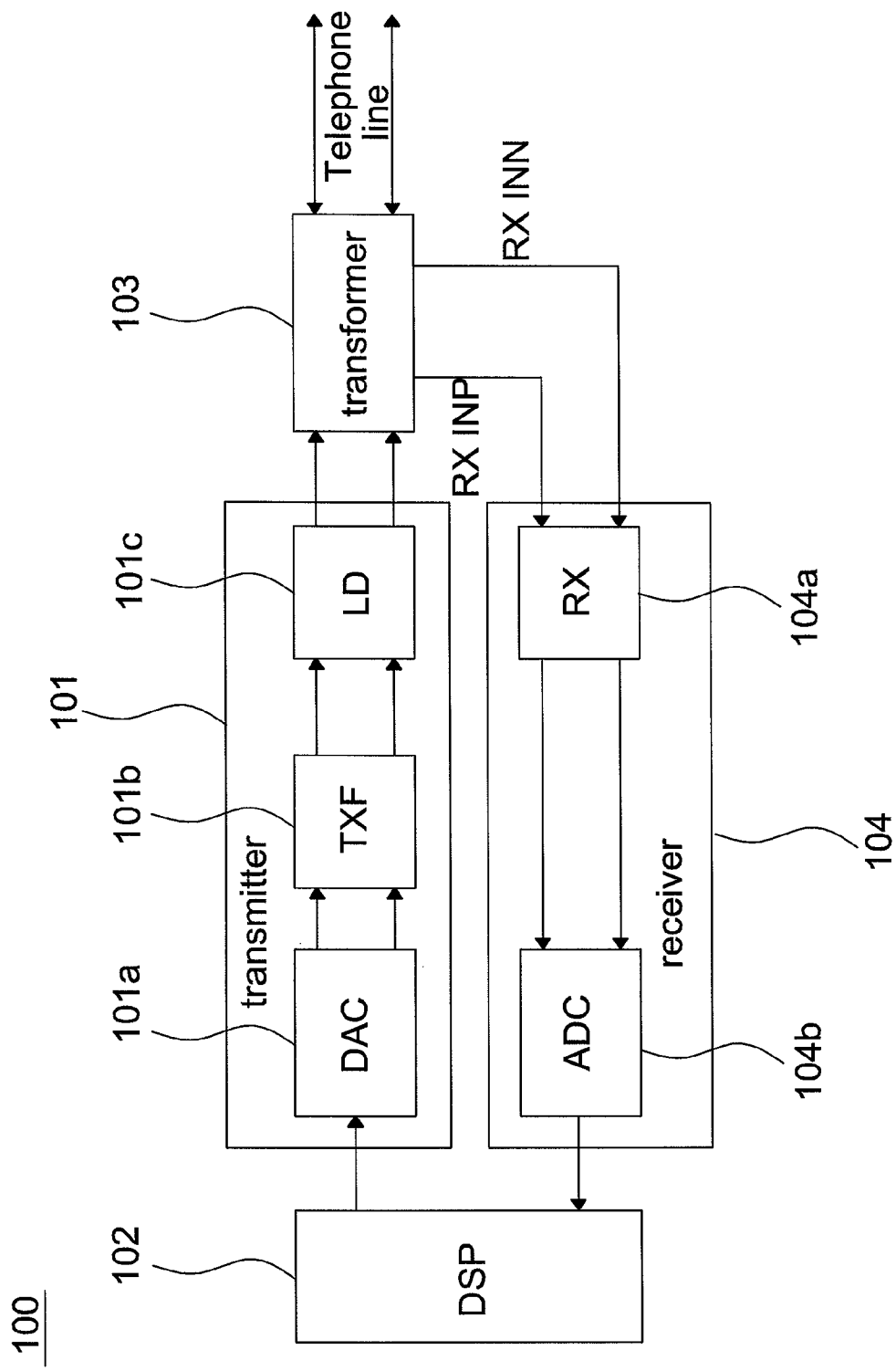
FIG. 1 shows a circuit block diagram illustrating an x-Digital Subscriber Line (xDSL) according to the prior art.
Figure 2A:
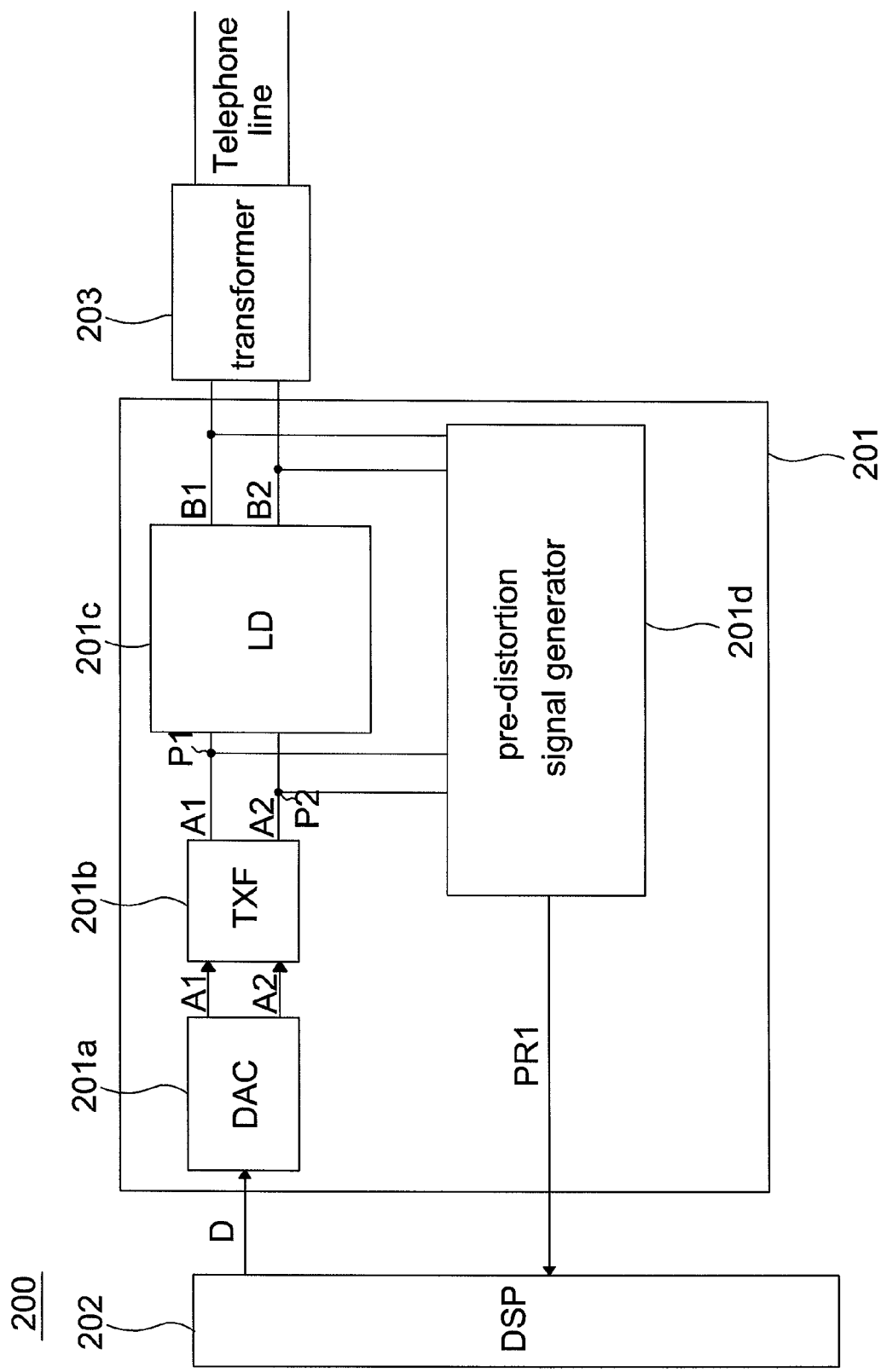
FIG. 2A shows a circuit block diagram illustrating an x-Digital Subscriber Line according to one embodiment of the invention.

FIG. 2A shows a circuit block diagram illustrating an x-Digital Subscriber Line (xDSL) 200 according to an embodiment of the invention. The xDSL 200 includes an analog front-end transmitter having a pre-distortion mechanism 201, a digital signal processor (DSP) 202, and a transformer 203. The analog front-end transmitter having a pre-distortion mechanism 201 includes a digital-to-analog converter (DAC) 201a, a transmission filter (TXF) 201b, a line driver (LD) 201c, and a pre-distortion signal generator 201d.

The digital signal processor 202 generates a digital signal D to output to the digital-to-analog converter 201a.

The digital-to-analog converter 201a converts the digital signal D into analog input differential signals A1, A2.

The transmission filter 201b filters and transmits the input differential signals A1, A2.

The line driver 201c receives an input differential signal A1, A2 and amplifies the input differential signal A1, A2 to generate output differential signal B1, B2. The input differential signal A1, A2 includes a first input signal A1 and a second input signal A2. The output differential signal B1, B2 includes a first output signal B1 and a second output signal B2. The line driver 201c receives the first input signal A1 at a first input node P1 to generate the first output signal B1. The line driver 201c receives the second input signal A2 at a second input node P2 to generate the second output signal B2.

The pre-distortion signal generator 201d is coupled to input ends and output ends of the line driver 201c. The pre-distortion signal generator 201d generates a pre-distortion signal PR1 according to a first difference ER1 (not shown in the figure) between the first input signal A1 and the first output signal B1, and a second difference ER2 (not shown in the figure) between the second input signal B1 and the second output signal B2 so as to adjust a signal output state of the analog front-end transmitter having a pre-distortion mechanism 201. Specifically to say, the pre-distortion signal generator may adjust the input signal A1 and A2 according to an amplification ratio corresponding to the line driver 201c for having the same comparison basis with the output signal B1 and B2 so as to calculate an adjusted first input signal A1 and the first output signal B1 to generate the first difference ER1 and calculate an adjusted second input signal A2 and the second output signal B2 to generate the second difference ER2.

The pre-distortion signal generator 201d detects the difference between input and output signals of the line driver 201c to obtain the state of the difference between input and output signals of the line driver 201c in advance so as to provide the state of the difference to the digital signal processor 202. Thus, adjusting linearity of the line driver 201c can be achieved.

Figure 2B:
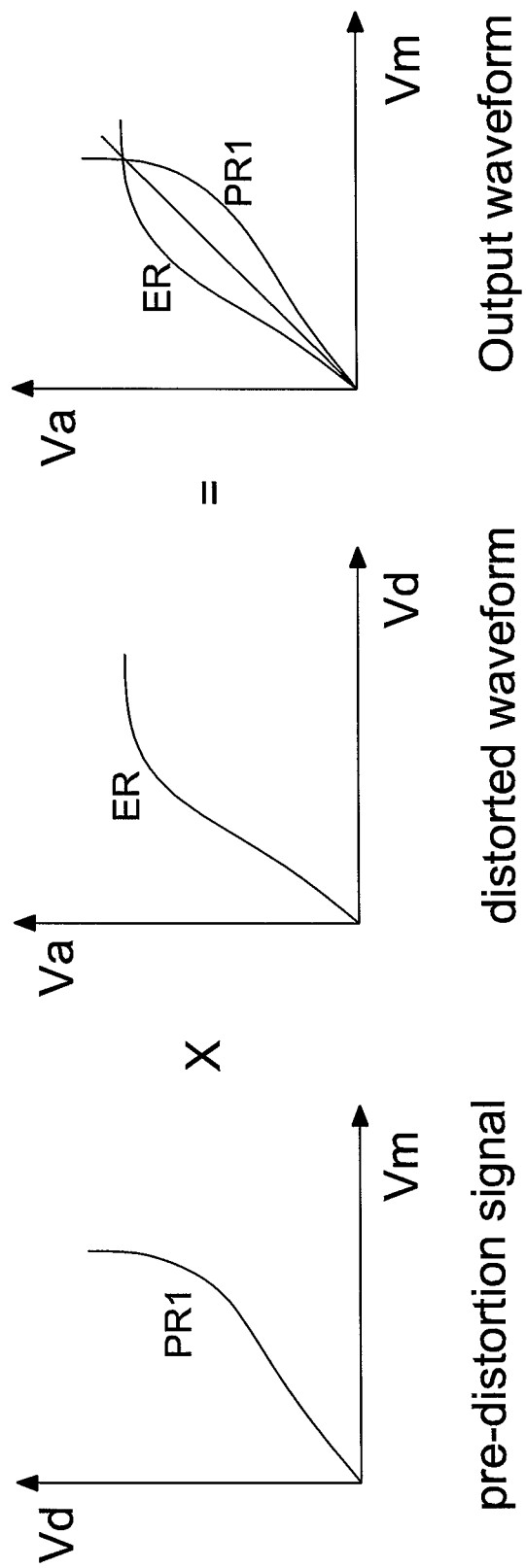
FIG. 2B shows a waveform diagram illustrating an x-Digital Subscriber Line according to one embodiment of the invention.

In an embodiment, the pre-distortion signal generator 201d of the embodiment of the present invention detects the signal differences ER1 and ER2 to generate the pre-distortion signal PR1, the waveform of which is shown on the left-hand side of FIG. 2B. The waveform ER while the line driver 201c is distorted is shown in the center of FIG. 2B. In this embodiment, the digital signal processor 202 compensates the distorted output differential signals B1, B2 of the line driver 201c of the analog front-end transmitter having a pre-distortion mechanism 201 according to the pre-distortion signal PR1. The waveform O of the output signal as shown in FIG. 2B can increase linearity outputted by the line driver 201c.

Figure 3:
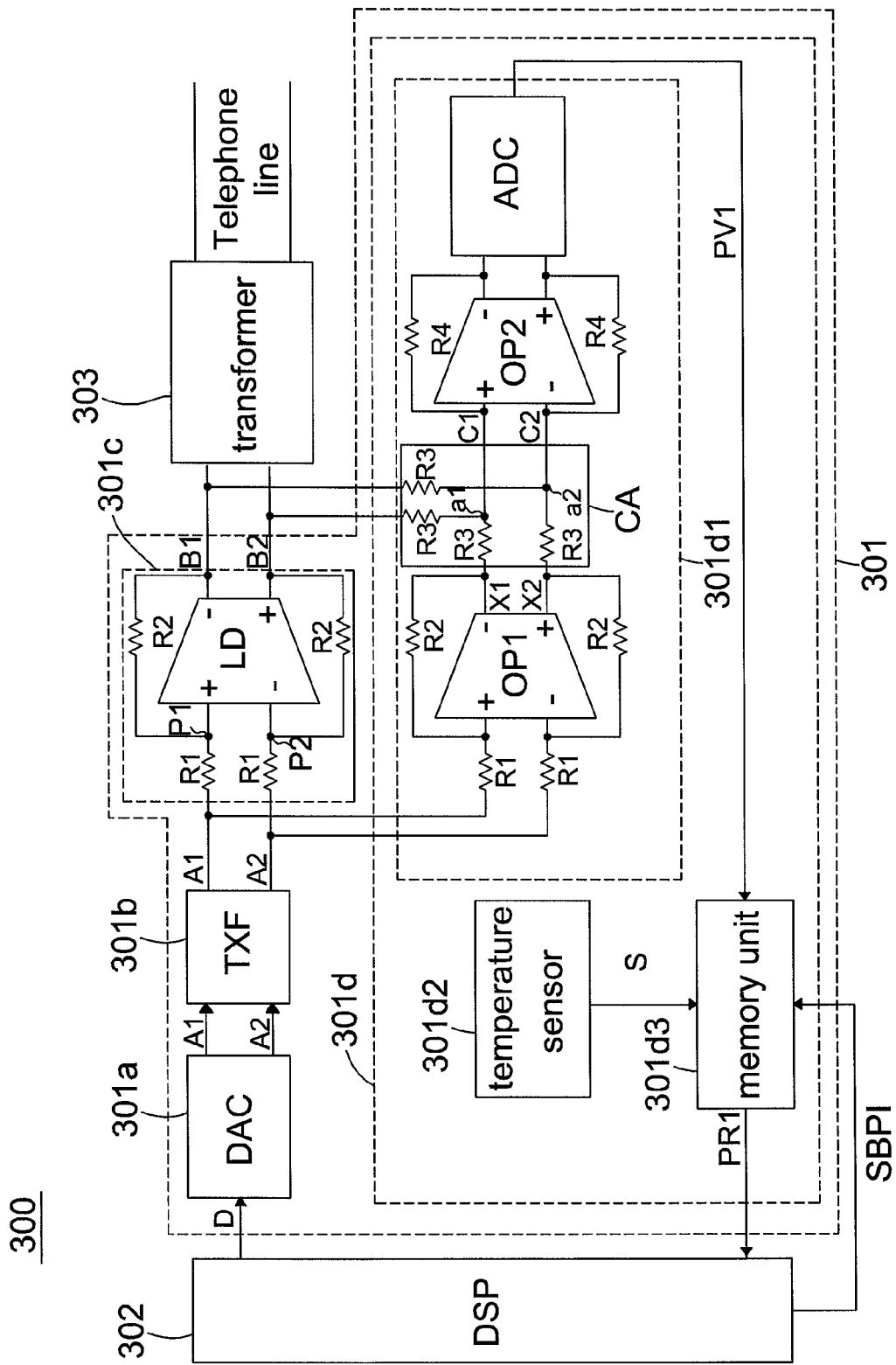
FIG. 3 shows a circuit block diagram illustrating an x-Digital Subscriber Line according to another embodiment of the invention.

FIG. 3 shows a circuit block diagram illustrating an x-Digital Subscriber Line 300 according to another embodiment of the invention. The xDSL 300 includes an analog front-end transmitter having a pre-distortion mechanism 301, a digital signal processor (DSP) 302, and a transformer 303. The analog front-end transmitter having a pre-distortion mechanism 301 includes a digital-to-analog converter (DAC) 301a, a transmission filter (TXF) 301b, a line driver (LD) 301c, and a pre-distortion signal generator 301d. The operating of the digital signal processor 302, the digital-to-analog converter 301a, the transmission filter (TXF) 301b, the line driver (LD) 301c, and the transformer 303 are similar to those shown in FIG. 2.

The pre-distortion signal generator 301d includes a calculating circuit 301d1, a temperature sensor 301d2, and a memory unit 301d3.

The calculating circuit 301d1 calculates the first difference ER1 and second difference ER2 to generate a pre-distortion value PV1.

In an embodiment, the digital signal processor 302 generates a swing band plan information SBPI to the memory unit 301d3 to provide setting specification of a pre-distortion table.

In an embodiment, the calculating circuit 301d1 includes a first operation amplifier OP1, a calculating unit CA, a second operation amplifier OP2, and an analog-to-digital converter ADC.

The first operation amplifier OP1 receives the first input signal A1 and the second input signal A2 to generate a first amplified signal X1 and a second amplified signal X2. It should be noted that in an embodiment the first and the second amplified signals outputted by the first input signal A1 may have the same amplitude and the same phase as the line driver 301c. The impedance at the output terminal of the first operation amplifier OP1 may be larger than that at the output terminal of the line driver 301c so as to reduce the design difficulty of the first operation amplifier OP1. The linearity of the first operation amplifier OP1 may be larger than that of the line driver 301c and the pre-distortion compensation effect can be determined by the performance of the transmission filter (TXF) 301b and the first operation amplifier OP1.

Since the first operation amplifier OP1 does not need to transmit signal energy to a telephone line like the line driver 301c, the impedance of the first operation amplifier OP1 is larger than that of the line driver 301c so that the operation amplifier OP1 is easier to be designed. In this way, the pre-distortion mechanism of the present invention may be operated under the condition that the output performance of the first operation amplifier OP1 is better than that of the line driver 301c so as to perform the subsequent calculating processing to obtain precise pre-distortion information.

The calculating unit CA adds the first amplified signal X1 and the second output signal B2 at a node a1 to generate a first calculating signal C1, since the signals X1 and B2 are in phase opposition. The calculating unit CA also adds the second amplified signal X2 and the first output signal B1 at a node a2 to generate a second calculating signal C2, since the signals X2 and B1 are in phase opposition. In an embodiment, the calculating unit CA includes a plurality of resistors R3 having the same resistance. A first pair of resistors R3 is coupled to form the node a1 and a second pair of resistors R3 is coupled to form the node a2. Each resistor R3 receives one signal among the first amplified signal X1, the first output signal B1, the second amplified signal X2, and the second output signal B2. At the nodes a1 and a2, the calculation process is executed to generate the first calculating signal C1 and the second calculating signal C2. It should be noted that the combination of the above mentioned resistors R3 of the calculating unit is only an example and the present invention is not limited to this example. It can be implemented by other elements or other combinations.

It should be noted that, in order to have the impedance by the output terminal of the first operation amplifier OP1 be larger than that of the line driver 301c, the resistance of the resistor R3 may be larger than the output load of the line driver 301c.

A second operation amplifier OP2 is used to amplify the first calculating signal C1 and the second calculating signal C2 to generate the first difference ER1 and the second difference ER2.

The analog-to-digital converter ADC converts the first difference ER1 and the second difference ER2 to generate the pre-distortion value PV1.

The temperature sensor 301d2 is used to sense temperature variation of the analog front-end transmitter having a pre-distortion mechanism 301 to generate a sensing signal S.

The memory unit 301d3 generates a pre-distortion table according to the repeatedly detected pre-distortion values PV1 and adjusts the pre-distortion table according to the sensing signal S. Further the pre-distortion signal generator 301d may generate the pre-distortion signal PR1 according to the pre-distortion table and output to the digital signal processor 302.

In an embodiment, it is assumed that the amplification ratio of the line driver 301c is 2.5, the first input signal A1 is +2V, and the second input signal A2 is −2V. Ideally, the first output signal B1 should be −5V and the second output signal B2 should be +5V. At the time, the amplification ratio of the first operation amplifier OP1 is set to correspond to that of the line driver 301c, that is, 2.5. Therefore, the first input signal A1 (+2V) and the second input signal A2 (−2V) are amplified to 2.5 times to generate a first amplified signal X1=−5V and a second amplified signal X2=+5V. It is assumed that the output of the line driver 301c itself has deviation, for example, the first output signal B1 becomes −4.9V and the second output signal B2 becomes +4.9V. Then, the calculating unit CA calculates the first amplified signal X1 and the second output signal B2 to obtain a first calculating signal C1=−0.1V; the calculating unit CA calculates the second amplified signal X2 and the first output signal B1 to obtain a second calculating signal C2=+0.1 V. In order to have the analog-to-digital converter ADC process the first calculating signal C1 and the second calculating signal C2, the second operation amplifier OP2 amplifies the first calculating signal C1 and the second calculating signal C2 to generate the first difference ER1 and the second difference ER2. For example, C1=−0.1V and C2=+0.1V are each multiplied by 10 to obtain the first difference ER1=−1V and the second difference ER2=±1V. Then, the analog-to-digital converter ADC converts the first difference ER1 and the second difference ER2 to generate the pre-distortion value PV1 to store in the memory unit 301d3.

It should be noted that the above values and ratios are only examples and the present invention is not limited to the above example. Any values may be used in design.

Furthermore, the input signal of the second operation amplifier OP2 is a difference between the output of the line driver 301c and the output of the first operation amplifier OP and the difference is amplified to conform to the dynamic range of the analog-to-digital converter ADC. Therefore, the difference after amplified by the second operation amplifier OP2 may be converted by an analog-to-digital converter ADC with lower specification. That is, no analog-to-digital converter ADC with high resolution like a general xDSL is required, to achieve the pre-distortion compensation effect and also designing an analog-to-digital converter ADC becomes easier. After the pre-distortion value PV1 outputted by the analog-to-digital converter ADC is transmitted to the pre-distortion table in the memory unit 301d3, the power of the calculating circuit 301d1 may be turned off. The pre-distortion values repeatedly detected can be used to compensate the line driver 301c and the temperature variation sensed by the temperature sensor 301d3 can be used as a value for fine adjustment. When the characteristic of the signal of the system is changed, the calculating circuit 301d1 is restarted to detect the pre-distortion values to adjust the pre-distortion table so as to achieve the purpose of power saving.

There are many different situations for transmitters of xDSL before online. Accompanying with different environments of telephone lines, there are many different characteristics but the external condition at the client end is stabilized after online. Therefore, once the xDSL 300 determines the pre-distortion values at the client end, the probability of re-detecting the pre-distortion values at the client end is low.

In conclusion, the xDSL according to the embodiment of the invention detects the pre-distortion information to compensate the line driver 301c to increase the linearity of the line driver 301c and improve power consumption of the xDSL to maintain the performance at the same time.

Figure 4A:
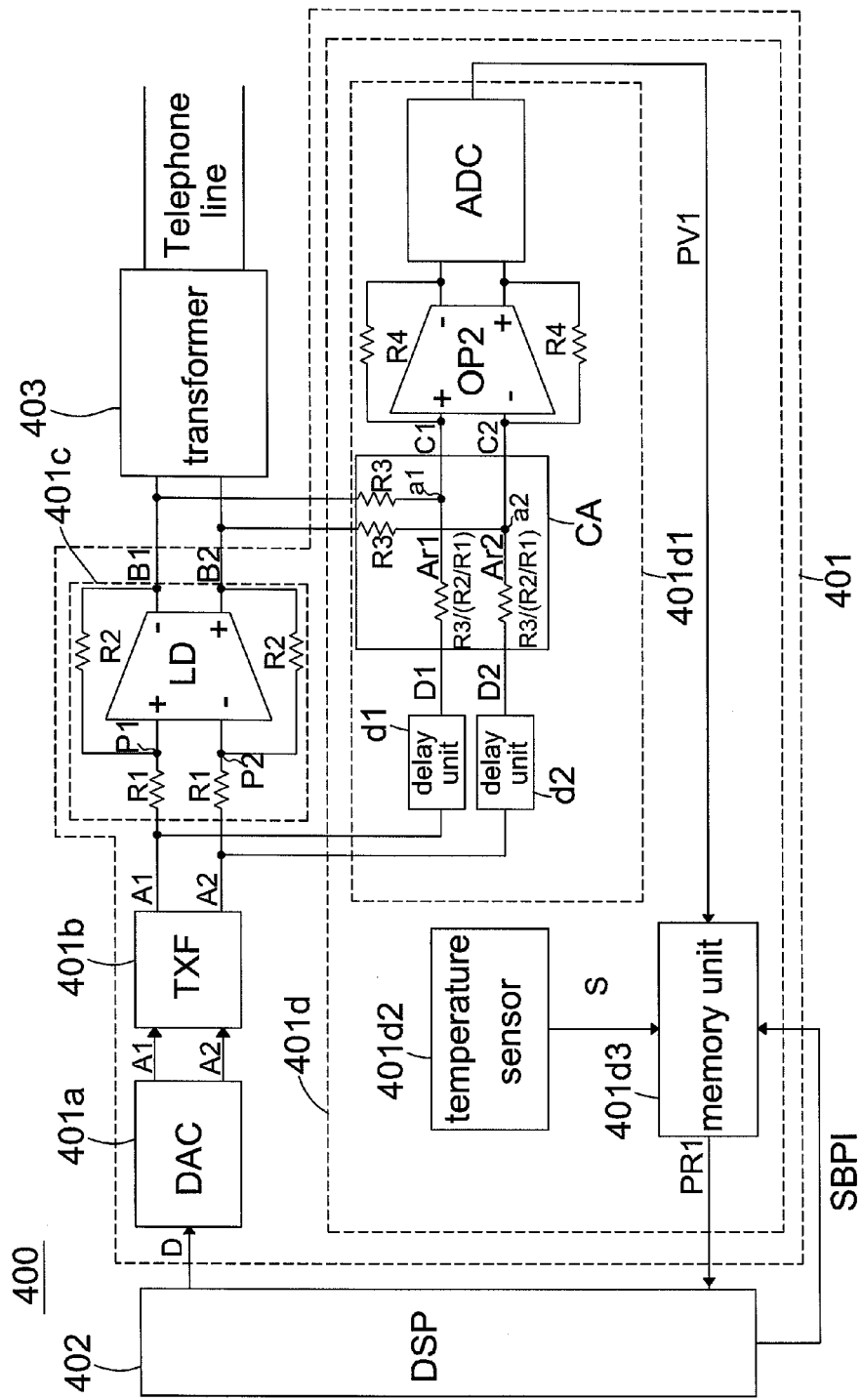
FIG. 4A shows a circuit block diagram illustrating an x-Digital Subscriber Line according to another embodiment of the invention.

FIG. 4 shows a circuit block diagram illustrating an x-Digital Subscriber Line 400 according to another embodiment of the invention. The xDSL 400 includes an analog front-end transmitter having a pre-distortion mechanism 401, a digital signal processor 402, and a transformer 403. The analog front-end transmitter having a pre-distortion mechanism 401 includes a digital-to-analog converter (DAC) 401a, a transmission filter (TXF) 401b, a line driver (LD) 401c, and a pre-distortion signal generator 401d. The pre-distortion signal generator 401d includes a calculating circuit 401d1, a temperature sensor 401d2, and a memory unit 401d3.

The operating of the digital signal processor 402, the digital-to-analog converter (DAC) 401a, the transmission filter (TXF) 401b, the line driver (LD) 401c, the transformer 403, the temperature sensor 401d2, and the memory unit 401d3 are similar to those shown in FIG. 3.

The calculating circuit 401d1 includes a first delay unit d1, a second delay unit d2, a calculating unit CA, a second operation amplifier OP2, and an analog-to-digital converter ADC.

Figure 4B:
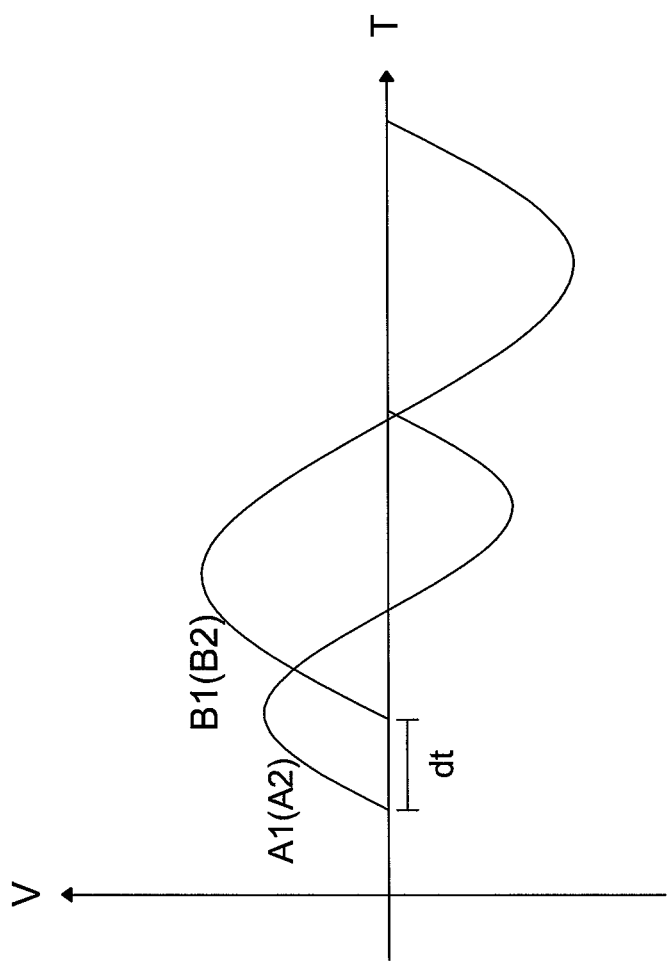
FIG. 4B shows a waveform diagram illustrating an x-Digital Subscriber Line according to another embodiment of the invention.

The first delay unit d1 is used to delay the first input signal A1 to generate a first delay signal D1. The second delay unit d2 is used to delay the second input signal A2 to generate a second delay signal D2. It should be noted that, as shown in FIG. 4B, there is delay time dt between the first input signal A1 and the first output signal B1 because of passing through the line driver 401c. Similarly, there is delay time dt between the second input signal A2 and the second output signal B2. The first delay unit d1 and the second delay unit d2 delay the first input signal A1 and the second input signal A2, respectively, to make the phase difference between the first and the second input signals A1, A2 and the first and the second delay signals D1, D2 be the same as or close to the phase difference between the input and output signals of the line driver 401c.

The calculating unit CA adjusts the first delay signal D1 to generate a first ratio adjustment signal Ar1. For example, the first delay signal D1 is multiplied by a preset ratio to generate the first ratio adjustment signal Ar1. The calculating unit CA adjusts the second delay signal D2 to generate a second ratio adjustment signal Ar2. For example, the second delay signal D2 is multiplied by a preset ratio to generate the second ratio adjustment signal Ar2. Then, the calculating unit CA adds the first ratio adjustment signal Ar1 and the first output signal B1 to cancel out the first ratio adjustment signal Ar1 and the first output signal B1 to generate a first calculating signal C1. The calculating unit CA adds the second ratio adjustment signal Ar2 and the second output signal B2 to cancel out the second ratio adjustment signal Ar2 and the second output signal B2 to generate a second calculating signal C2.

In an embodiment, the calculating unit CA includes a plurality of resistors R3 having the same resistance and a plurality of resistors having a resistance of R3/(R2/R1). The first resistor R3 and the first resistor R3/(R2/R1) are coupled to form a node a1 and the second resistor R3 and the second resistor R3/(R2/R1) are coupled to form a node a2. The first resistor R3/(R2/R1) receives the first delay signal D1 and generates the first ratio adjustment signal Ar1. The second resistor R3/(R2/R1) receives the second delay signal D2 and generates the second ratio adjustment signal Ar2. The first resistor R3 receives the first output signal B1 and the second resistor R3 receives the second output signal B2. At the nodes a1, a2, the calculating unit CA processes the first and the second ratio adjustment signals Ar1, Ar2 and the first and the second output signals B1, B2 to generate the first and the second calculating signals C1, C2. It should be noted that the configuration of resistors of the calculating unit CA shown in the above is only one example and the present invention is not limited to the above example. It can be implemented by other elements or other combinations. It should be also noted that the calculating unit CA adjusts the resistance R3/(R2/R1) to have the amplitude of the first and the second ratio adjustment signals Ar1, Ar2 be the same as that of the first and the second output signals B1, B2 so as to replace the first operation amplifier OP1 shown in FIG. 3.

It should be noted that, in order to have the impedance by the output terminals of the first delay unit d1 and the second delay unit d2 be much larger than that of the line driver 401c, the resistance of the resistor R3 may be larger than the output load of the line driver 401c.

A second operation amplifier OP2 is used to amplify the first calculating signal C1 and the second calculating signal C2 to a preset range to generate the first difference ER1 and the second difference ER2.

It should be noted that the embodiment of FIG. 3 uses the first operation amplifier OP1 to delay and amplify the signal but in this embodiment the first and the second delay units d1, d2 are used to replace the delaying function of the first operation amplifier OP1 and the calculating unit CA is used to adjust the first and the second delay units d1, d2 to a certain ratio to be canceled out together with the first and the second output signals B1, B2. In this way, the non-ideal effect caused by the first operation amplifier OP1 can be reduced.

Figure 5A:
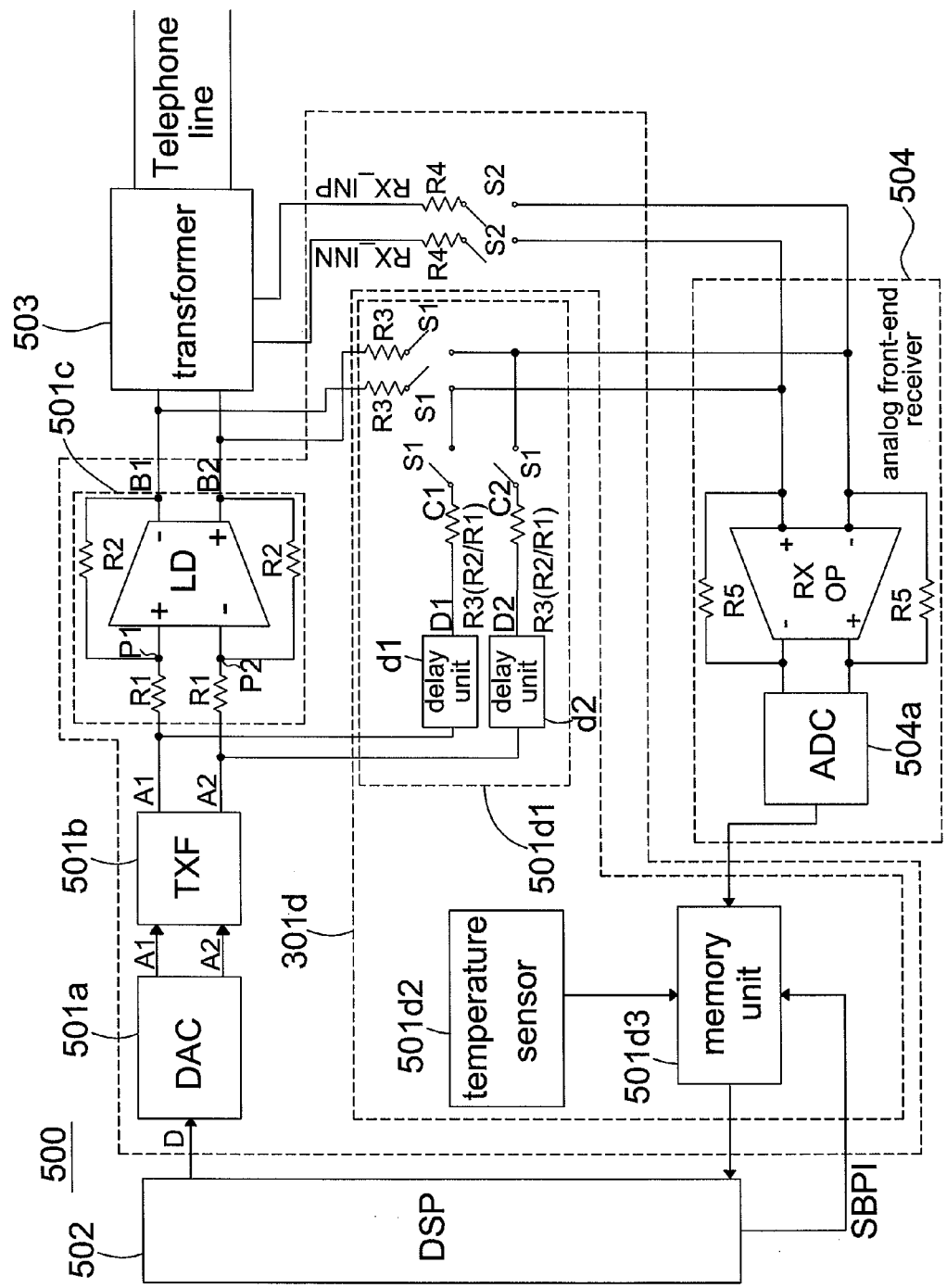
FIG. 5A shows a circuit block diagram illustrating an x-Digital Subscriber Line according to another embodiment of the invention.

Furthermore, an analog-to-digital converter ADC and/or a second operation amplifier OP2 can be applicable to the receiver of the analog front end. FIG. 5A shows a circuit block diagram illustrating an x-Digital Subscriber Line 500 according to another embodiment of the invention. The xDSL 500 includes an analog front-end transmitter having a pre-distortion mechanism 501, a digital signal processor (DSP) 502, a transformer 503, and an analog front-end receiver 504. The analog front-end transmitter having a pre-distortion mechanism 501 includes a digital-to-analog converter 501a, a transmission filter (TXF) 501b, a line driver (LD) 501c, and a pre-distortion signal generator 501d. The pre-distortion signal generator 501d includes a calculating circuit 501d1, a temperature sensor 501d2, and a memory unit 501d3.

As shown in the figure, the analog front-end transmitter having a pre-distortion mechanism 501 further includes a plurality of switches S1, S2, for switching the coupling between the analog-to-digital converter ADC and the analog front-end transmitter having a pre-distortion mechanism 501 within a preset period of time and switching the coupling between the second operation amplifier OP2 and the analog front-end transmitter having a pre-distortion mechanism 501 within the preset period of time. As shown in the figure, the analog front-end transmitter having a pre-distortion mechanism 501 borrows the analog-to-digital converter 504a and the receiver operation amplifier RX OP of the analog front-end receiver 504 without additional analog-to-digital converter and operation amplifier. The xDSL 500 uses switches to turn off the switch S1 and turn on the switch S2 at a normal mode to have the analog front-end receiver 504 receive the signals RX_INN and RX_INP transmitted by the transformer 503; and to turn on the switch S1 and turn off the switch S2 at a pre-distortion mode to have the analog front-end receiver 504 stop operating and have the analog front-end transmitter having a pre-distortion mechanism 501 use the analog-to-digital converter 504a and the receiver operation amplifier RX OP of the analog front-end receiver 504. The internal module is used to execute the pre-distortion mode to build up a pre-distortion table for various environments and store the pre-distortion table in the memory unit 503d3. During the xDSL 500 is actually online, the pre-distortion mode is turned off and the swing band plan information SBPI provided by the digital signal processor 502 and the control of the temperature sensor 501d2 to read the pre-distortion values are utilized to adjust the signal state of the analog front-end transmitter having a pre-distortion mechanism 501 to compensate the linearity deviation of the line driver 501c.

Figure 5B:
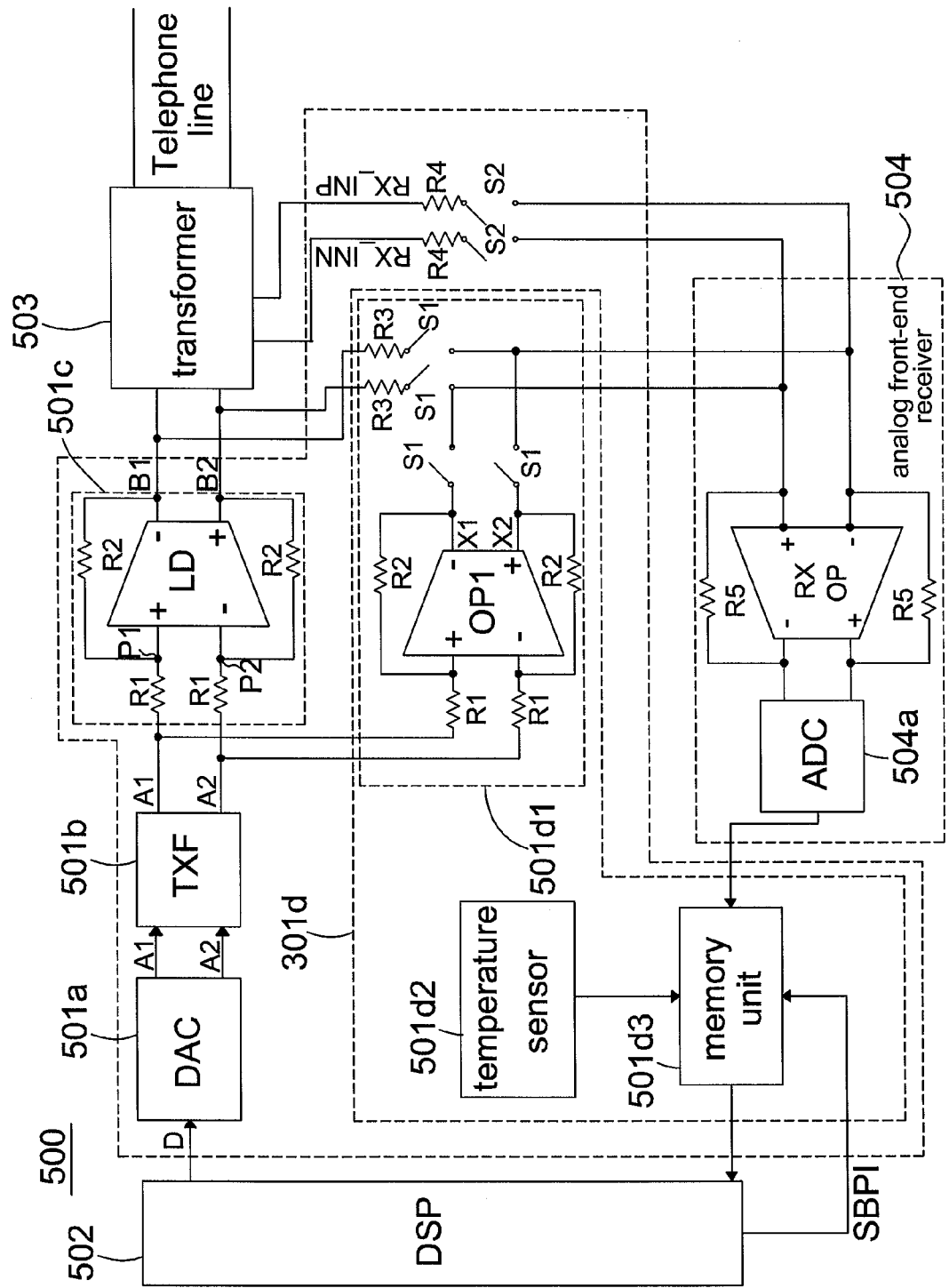
FIG. 5B shows a circuit block diagram illustrating an x-Digital Subscriber Line according to another embodiment of the invention.

Applying an analog-to-digital converter ADC and/or a second operation amplifier OP2 to the receiver of the analog front end, like the other embodiment shown in FIG. 5B, can be implemented. The configuration and the coupling relationship are shown in the figure. Since one skilled in the art can understand from the above description, their further details will not be given hereinafter.

Figure 6:
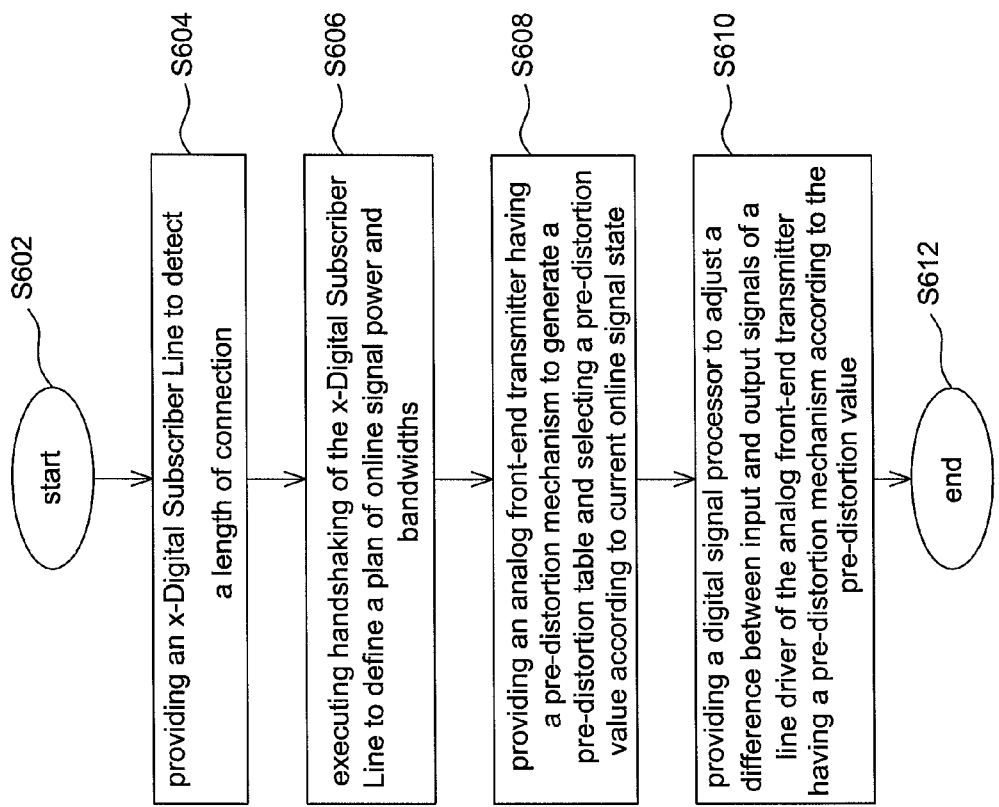
FIG. 6 shows a flow chart illustrating a connection method of an x-Digital Subscriber Line having a pre-distortion mechanism according to one embodiment of the invention.

FIG. 6 shows a flow chart illustrating a connection method of an x-Digital Subscriber Line having a pre-distortion mechanism according to one embodiment of the invention.

Step S602: start;

Step S604: providing an x-Digital Subscriber Line to detect a length of connection;

Step S606: executing handshaking of the x-Digital Subscriber Line to define a plan of online signal power and bandwidths;

Step S608: providing an analog front-end transmitter having a pre-distortion mechanism to generate a pre-distortion table (such as a look-up table including pre-distortion values) and selecting a pre-distortion value according to current online signal state; and Step S610: providing a digital signal processor to adjust a difference between input and output signals of a line driver of the analog front-end transmitter having a pre-distortion mechanism according to the pre-distortion value;

Step S612: end.

Figure 7:
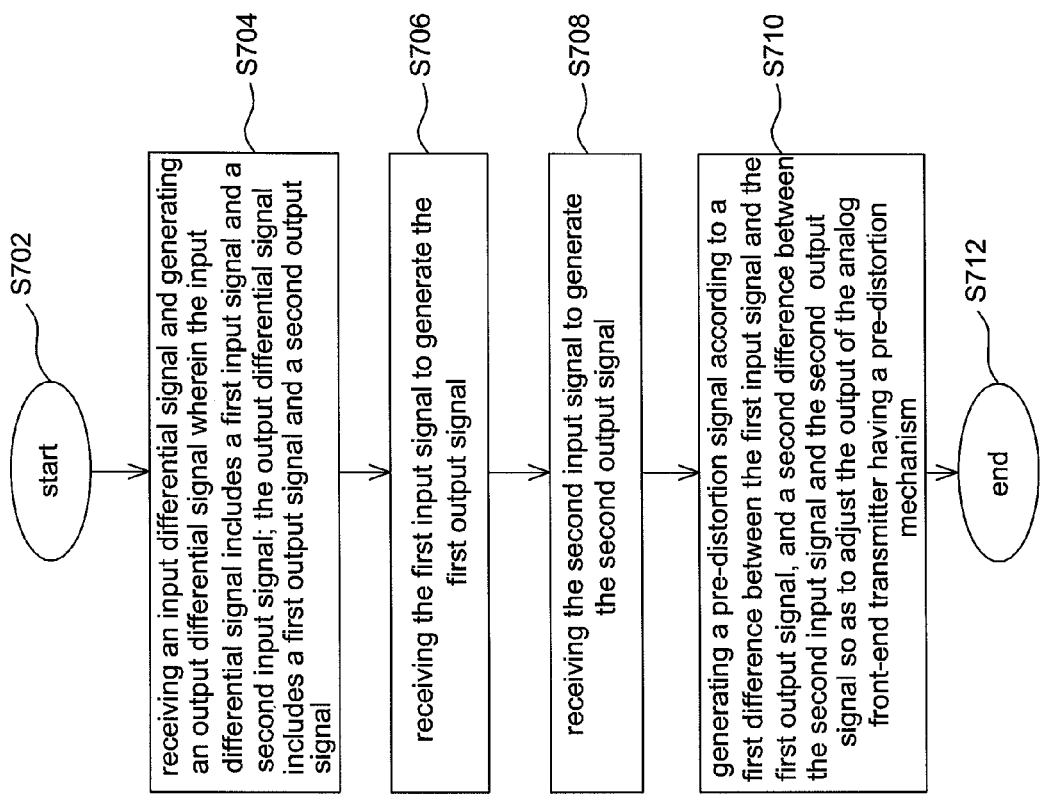
FIG. 7 shows a flow chart illustrating a method for adjusting an output of an analog front-end transmitter having a pre-distortion mechanism according to one embodiment of the invention.

FIG. 7 shows a flow chart illustrating a method for adjusting an output of an analog front-end transmitter having a pre-distortion mechanism according to an embodiment of the invention.

Step S702: start;

Step S704: receiving an input differential signal and generating an output differential signal wherein the input differential signal includes a first input signal and a second input signal; the output differential signal includes a first output signal and a second output signal;

Step S706: receiving the first input signal to generate the first output signal;

Step S708: receiving the second input signal to generate the second output signal; and Step S710: generating a pre-distortion signal according to a first difference between the first input signal and the first output signal, and a second difference between the second input signal and the second output signal so as to adjust the output of the analog front-end transmitter having a pre-distortion mechanism.

Step S712: end.

The analog front-end transmitter having a pre-distortion mechanism and the above mentioned method according to the embodiment of the invention use the difference between the detected input and output signals of the line driver to generate pre-distortion information so as to compensate performance of the line driver to achieve the purposes of increasing linearity of a line driver and reducing power consumption of circuits of an xDSL.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. An analog front-end transmitter having a pre-distortion mechanism, comprising:
 a line driver, for receiving an input differential signal and generating an output differential signal wherein the input differential signal comprises a first input signal and a second input signal; the output differential signal comprises a first output signal and a second output signal; the line driver receives the first input signal to generate the first output signal and receives the second input signal to generate the second output signal; and
 a pre-distortion signal generator, coupled to input ends and output ends of the line driver, wherein the pre-distortion signal generator generates a pre-distortion signal according to a first difference between the first input signal and the first output signal, and a second difference between the second input signal and the second output signal so as to adjust an output of the analog front-end transmitter having a pre-distortion mechanism.

2. The analog front-end transmitter having a pre-distortion mechanism according to claim 1, wherein the pre-distortion signal generator comprises:

a calculating circuit, for calculating the first difference and second difference to generate a pre-distortion value;
 a temperature sensor, for sensing a temperature of the analog front-end to generate a sensing signal; and
 a memory unit, for generating a pre-distortion table according to the repeatedly detected pre-distortion values and adjusting the pre-distortion table according to the sensing signal;
 wherein the pre-distortion signal generator generates the pre-distortion signal according to the pre-distortion table.

3. The analog front-end transmitter having a pre-distortion mechanism according to claim 2, further comprising a digital signal processor wherein the digital signal processor adjusts an output of a digital-to-analog converter of the analog front-end transmitter having a pre-distortion mechanism according to the pre-distortion signal.

4. The analog front-end transmitter having a pre-distortion mechanism according to claim 3, wherein the digital signal processor generates swing band plan information to the memory unit to define the pre-distortion table.

5. The analog front-end transmitter having a pre-distortion mechanism according to claim 2, wherein the calculating circuit comprises:
 a first operation amplifier, receiving the first input signal and the second input signal to generate a first amplified signal and a second amplified signal wherein the first output signal and the second amplified signal are in phase opposition and the second output signal and the first amplified signal are in phase opposition;
 a calculating unit, adding the first amplified signal and the second output signal at a node to generate a first calculating signal, and adding the second amplified signal and the first output signal at another node to generate a second calculating signal; and
 a second operation amplifier, amplifying the first calculating signal and the second calculating signal to generate the first difference and the second difference.

6. The analog front-end transmitter having a pre-distortion mechanism according to claim 1, wherein the calculating circuit comprises:
 a first delay circuit, delaying the first input signal to generate a first delay signal;
 a second delay circuit, delaying the second input signal to generate a second delay signal;
 a calculating unit, adjusting the first delay signal to generate a first ratio adjustment signal, adjusting the second delay signal to generate a second ratio adjustment signal, adding the first ratio adjustment signal and the first output signal at a node to generate a first calculating signal, and adding the second ratio adjustment signal and the second output signal at another node to generate a second calculating signal; and
 a second operation amplifier, amplifying the first calculating signal and the second calculating signal to a preset range to generate the first difference and the second difference.

7. The analog front-end transmitter having a pre-distortion mechanism according to claim 2, wherein the calculating circuit further comprises an analog-to-digital converter, converting the first difference and the second difference to generate the pre-distortion value.

8. The analog front-end transmitter having a pre-distortion mechanism according to claim 7, wherein the analog-to-digital converter is applicable to an analog front-end receiver.

9. The analog front-end transmitter having a pre-distortion mechanism according to claim 7, wherein the second operation amplifier is applicable to an analog front-end receiver.

10. The analog front-end transmitter having a pre-distortion mechanism according to claim 8, further comprising:
a plurality of switches, for switching the coupling between the analog-to-digital converter and the analog front-end transmitter having a pre-distortion mechanism within a preset period and switching the coupling between the second operation amplifier and the analog front-end transmitter having a pre-distortion mechanism within the preset period.

11. The analog front-end transmitter having a pre-distortion mechanism according to claim 9, further comprising:
a plurality of switches, for switching the coupling between the analog-to-digital converter and the analog front-end transmitter having a pre-distortion mechanism within a preset period and switching the coupling between the second operation amplifier and the analog front-end transmitter having a pre-distortion mechanism within the preset period.

12. The analog front-end transmitter having a pre-distortion mechanism according to claim 1, wherein the pre-distortion signal generator adjusts the first input signal and the second input signal according to an amplification ratio corresponding to the line driver.

13. A connection method of an x-Digital Subscriber Line, comprising:
providing an x-Digital Subscriber Line to detect a length of connection;
executing handshaking of the x-Digital Subscriber Line to define a plan of online signal power and bandwidths;
receiving an input differential signal and generating an output differential signal, wherein the input differential signal comprises a first input signal and a second input signal, and the output differential signal comprises a first output signal and a second output signal;
calculating a first difference between the first input signal and the first output signal and a second difference between the second input signal and the second output signal to generate a pre-distortion value, and generating a pre-distortion table according to repeatedly detected pre-distortion values;
selecting a pre-distortion value from the pre-distortion table according to current online signals; and
providing a digital signal processor to adjust a difference between input and output signals of a line driver of the analog front-end transmitter having a pre-distortion mechanism according to the pre-distortion value.

14. The connection method according to claim 13, wherein the pre-distortion table is a look-up table comprising a plurality of repeatedly detected pre-distortion values.

15. A method for adjusting an output of an analog front-end transmitter having a pre-distortion mechanism, comprising:
receiving an input differential signal and generating an output differential signal wherein the input differential signal comprises a first input signal and a second input signal; the output differential signal comprises a first output signal and a second output signal;
receiving the first input signal to generate the first output signal;
receiving the second input signal to generate the second output signal; and
generating a pre-distortion signal according to a first difference between the first input signal and the first output signal, and a second difference between the second input signal and the second output signal so as to adjust the output of the analog front-end transmitter having a pre-distortion mechanism.

* * * * *